United States Patent [19]

Higurashi et al.

[11] Patent Number: 4,775,546

[45] Date of Patent: Oct. 4, 1988

[54] PROCESS FOR TREATING POTASSIUM CHLORIDE

[75] Inventors: Mikio Higurashi, Musashino; Hiroaki Fujiki, Yokohama; Kaoru Nishino, Kawasaki, all of Japan

[73] Assignee: Meiji Seika Kaisha, Ltd., Tokyo, Japan

[21] Appl. No.: 876,583

[22] Filed: Jun. 20, 1986

[30] Foreign Application Priority Data

Jul. 5, 1985 [JP] Japan .................................. 60-146593
Oct. 8, 1985 [JP] Japan .................................. 60-222844

[51] Int. Cl.$^4$ ............................................. A23L 1/237
[52] U.S. Cl. .................................. 426/649; 23/302 R; 423/179; 423/202
[58] Field of Search ............. 23/302 R, 303; 426/455, 426/465, 471, 492, 649; 203/12, 99; 423/179, 202, 208

[56] References Cited

U.S. PATENT DOCUMENTS

| | | | |
|---|---|---|---|
| Re. 27,981 | 4/1974 | Frank et al. | 426/649 |
| 1,874,055 | 8/1932 | Liebrecht | 426/649 |
| 2,383,763 | 8/1945 | Bloch et al. | 23/302 R |
| 2,471,144 | 5/1949 | Davy | 426/649 |
| 3,505,082 | 4/1970 | Miller | 426/649 |
| 4,068,006 | 1/1978 | Moritz | 426/649 |

FOREIGN PATENT DOCUMENTS

| | | |
|---|---|---|
| 47-13698 | 4/1972 | Japan . |
| 57-138359 | 8/1982 | Japan . |
| 58-81758 | 5/1983 | Japan . |
| 59-198953 | 11/1984 | Japan . |

OTHER PUBLICATIONS

The Chemical Dictionary, Tenth Edition, Revised by Gessner G. Hawley, Van Nostrand Reinhold Company, New York, ©1981, p. 289.

*Primary Examiner*—Patrick P. Garvin
*Assistant Examiner*—George R. Fourson
*Attorney, Agent, or Firm*—Armstrong, Nikaido, Marmelstein & Kubovcik

[57] ABSTRACT

A process for treating potassium chloride, wherein the potassium chloride is dissolved in an aqueous medium and resulting solution is heated to evaporate water contained therein.

9 Claims, No Drawings

PROCESS FOR TREATING POTASSIUM CHLORIDE

BACKGROUND OF THE INVENTION

1. Field of the Invention

The present invention relates to a process for treating potassium chloride and more particularly to that for decreasing or taking away bitterness, bad aftertaste and the like undesirable tastes inherent in the potassium chloride.

2. Related Arts

A salting agent is one of important tasting agents to be employed for processing and/or cooking foodstuffs, together with sweetening, souring, seasoning and other agents, and sodium chloride (table salt) is listed as an example of one. In addition to giving a salty taste to various foodstuffs, sodium chloride is important as a preserving agent therefor to prevent putrefaction or molding, and has a close relation with our dietary life in that it is widely employed for preserving fishes and shellfishes in salt as well as for preparing Japanese bean paste (so-called "Miso"), Japanese soy sauces (so-called "Syouyu"), salted and cured vegetables (so-called "Tsukemono"), boiled foods in Japanese soy (so-called "Tsukudani") and the like.

In recent years, however, a relationship between circulatory disorders, so-called "geriatric diseases" such as hyperpiesia, cardiacs or the like, and an excess intake of the sodium chloride has been reported and thus it has been recommended to decrease its intake to cure or prevent the circulatory disorders, kidney diseases, hepatocirrhosis and the like. Therefore, there is a somewhat high tendency to select foodstuffs free from the sodium chloride or containing the same at a lower level, and even healthy persons are concerned. The sodium chloride or the like salting agent, however, complements another agent, for instance, emphasizing the sweetness of a sweetening agent and it can not be avoided that a salty agent-free foodstuff is insipid, showing little or unsufficient taste or flavour. Further, preservation, of course, is reduced if sodium chloride is not used in processing of the foodstuffs.

Therefore, various studies have been made on a salting agent to be substituted for the sodium chloride. An example of a substitute is potassium chloride. The potassium chloride can be obtained from rock-salt (halite), is available commercially at a reasonable price, has no problem with the Food Sanitation Law, has physical properties similar to sodium chloride in molecular weight, crystal structure, solubility and the like, and has effects similar to sodium chloride in preventing against putrefaction and molding, and thus a salting agent, in which a part of sodium chloride is substituted by potassium chloride has been marketed. However, such a marketed salty agent has not widely been employed in the food industry and usual daily diet, since a foreign bitterness and aftertaste will appear, as the mixing ratio of the potassium chloride is increased.

For this purpose, namely for removing such bad taste, various proposals have been made, but each of which intends mainly a masking of the inherent bitterness of potassium chloride, by adding an organic acid such as citric acid, amino acid, a salt thereof, a sweetening agent or a seasoning. For instance, Japanese Unexamined Patent Publication No. 138359/1982 discloses the addition of at least one of glycine, L-alanine, 5'-sodium inosinate, L-sodium glutamate, glycyrrhizin and sodium glycyrrhetinate, and Japanese Unexamined Patent Publication No. 81758/1983 discloses the addition of at least one of sweeteners selected from glycyrrhizin, glycyrrhiza extract, stevioside, monoglucosylstevioside and edible synthetic sweeteners. Further, Japanese Examined Patent Publication No. 13698/1972 discloses a method of preparation of a cooking salt composition, wherein about 20 to 80 weight % of sodium chloride and about 80 to 20 weight % of potassium chloride are mixed to obtain a homogeneous mixture. However, each of such substituting compositions is a mere mixture of powdered raw materials and thus there is a possibility of causing a localization and classification of each component during transportation and use. In addition, there are various problems in the mixing manner and mixing ratio, since homogenous mixing will become difficult when a small amount of the taste improving agent is added to the potassium chloride, and if such agent is added in excess, an inherent taste thereof develops which may impart a bad taste to the foodstuff per se.

Therefore, a study has been tried for not merely masking the bitterness and other undesirable tastes of the potassium chloride but positively suppressing the same to make the taste similar to that of sodium chloride. For instance, Japanese Unexamined Patent Publication No. 198953/1984 discloses a low sodium salting seasoning which comprises a mixture of sodium chloride and potassium chloride in a weight ratio of 1:9 to 1:1 and powdered bittern in 1 to 20 weight % of the seasoning per se. This prior art has a singularity in that a negation of the bitterness of the potassium chloride is intended by adding the powdered bittern which is one of bitter sources. This proposal, however, has disadvantages in that the sodium chloride should be added in at least 10 weight % based on the potassium chloride, and that the use of bittern causes moisture absorption and an acceleration of caking in the potassium chloride, even if the bittern is added in the form of powder.

SUMMARY OF THE INVENTION

A primary object of the present invention is to provide a process for treating potassium chloride, which relates not to a mere masking of the undesirable tastes such as bitterness and bad aftertaste inherent thereto but to a positive reduction or removal thereof, without affecting any advantageous characteristic of the potassium chloride.

A specific object of the invention is to provide a process for treating potassium chloride, which can be carried out with a simple and easy operation, without use of any specific treating agent, so as to save processing costs.

According to the invention, the objects of the the invention can be attained by a process for treating potassium chloride which comprises dissolving the raw material potassium chloride into an aqueous medium and evaporating water contained in the resulting aqueous solution.

In the specification, the term "raw material potassium chloride" refers in particular, but not exclusively, to that for food industry use, which is separated and refined from rock salt and contains 99 weight % or more of potassium chloride, when a quantitative analysis thereof is carried out after drying for 2 hours at a temperature of about 105° C.

The aqueous medium used in the invention means a "fresh water" and "salty water". The "fresh water"

includes drinking waters such as service or city water, drinking well water, mineral water, drinking spring water and the like as well as distilled water and deionized water. The drinking water may include Na, K, Mg and other mineral ions, Cl, $SO_4$ and the like negative ions, salts, free carbonate, mineral acids, organic acids and other components which may remain, when the drinking water is evaporated to dryness, but cause no problems. If necessary, such components or amino acids such as glycine, alanine, glutamic acid can positively be added in the drinking water. In the case of distilled water or deionized water, such additive components should be added in the manner described below. When the mineral ions are added with use of a raw material salt which is hard to dissolve in water, an acid may be added to reduce pH in the water for aiding the dissociation of the salt into ions. It is preferable to avoid an excess use, if such additive component per se has a taste. For instance, it is not preferable to add the organic acid and a salt thereof or the amino acid and a salt thereof in excess of about 1 or 2 weight % based on the potassium chloride, respectively. The "salty water" includes sea water, brine obtained by concentrating the sea water, salt lake water, salt spring water, a salt water prepared by dissolving raw salt or rock salt in water, and the like but does not include those contaminated with bacteria or heavy metals. Foreign materials such as dust, sand and the like which may present in the aqueous medium should be eliminated.

In the case the aqueous medium is drinking water or additive containing water, the raw material potassium chloride is dissolved therein. The solubility of potassium chloride in water of 100 g is 34.4 g at 20° C. and 45.9 g at 60° C., but the amount added may be suitably set by taking the dissolving temperature into consideration. It should be noted, however, that the quality of the water used exerts an influence on the taste improvement of potassium chloride. Namely, it necessary that the water serving as the aqueous medium without additional potassium chloride has an electrical conductivity of about 140 $\mu S/cm$ or more. And then 45 g of potassium chloride are dissolved in 100 g of water. If water having an electrical conductivity less than about 140 $\mu S/cm$ is employed, the electrical conductivity is adjusted to 140 $\mu S/cm$ or more, by concentrating the water or adding the mineral ion, organic acid, amino acid and/or salt thereof. If the amount of mineral ion is increased in the dissolving water, a processed potassium chloride which is enhanced in salty taste can be obtained.

It is to be noted that said "electrical conductivity" is the reciprocal of the electrical resistance between opposed faces of a bulk solution having a section of 1 $cm^2$ and a length of 1 cm, and the value given in the above was that as measured at 25° C. with use of the Conduct Meter (type CM-73) manufactured by Toa Denpa Kabusiki Kaisha (Toa Electric Wave Co., Ltd.), Japan, and that this value has a relation to a total amount of positive and negative ions in the water of the drinking water or the water containing additives. For instance, the electrical conductivities of Na, Ca and Cl ions in a concentration of 1 mg/l at 25° C. are as follows.

$Na^+$: 2.13 ($\mu S/cm$)
$Ca^{++}$: 2.60
$Cl^-$: 2.14

The term "mineral ion" means, mono or divalent ion dissociated in water. A mineral insoluble in water does not exert any influence on the taste improvement of potassium chloride. For instance, a processed potassium chloride obtained through the steps of adding into a distilled water $CaCO_3$ or the like salt which is insoluble in water, dissolving a raw material potassium chloride in the resulting solution and then evaporating water therein does not show any effect on reduction of bitterness and increase of salty taste. However, if malic acid or the like organic acid is added in the solution to solubilize $CaCO_3$ for generating Ca ion, the resulting processed potassium chloride shows an improved taste. This fact means that the dissociated ion in water exerts a great influence on the taste improvement of the processed potassium chloride. It is to be noted, further that another processed potassium chloride obtained through the steps of dissolving raw material potassium chloride in water having a required quality to prepare a dense potassium chloride solution, recrystallizing the potassium chloride with utilization of the difference in solubility, filtering the crystals, dewatering and drying so as to have a predetermined moisture content, shows no taste improvement and is similar to non-treated potassium chloride. This means that the evaporation of water is a main and indispensable requirement for the invention.

The salty water may be diluted with the drinking water, distilled water or deionized water, using the same as the aqueous medium for dissolving the raw material potassium chloride. It is preferable that in this case, the salty water is added in at least about 0.45 weight parts based on standard sea water, to 1 weight part of the raw material potassium chloride (see result of Test Example, referred to later). There is no upper limitation on the salty water amount, but it is preferable that the amount of sodium chloride in the salty water is not greater than the amount of potassium chloride, so as to avoid an excess intake of the sodium chloride. According to the invention, the raw material potassium chloride is dissolved in such aqueous medium and the resulting aqueous solution is subjected to evaporation to crystallize a mixed crystal of the potassium chloride and various components in the salty water. It should be noted that a recrystallization of the potassium chloride utilizing a solubility difference shows no advantageous effect on taste improvement and thus the evaporation of water constitutes a main and indispensable step, also in this case.

In any case of using the fresh or salty water as the aqueous medium, the evaporation of water can be carried out in a manner known, for instance evaporating to dryness, spray drying, vacuum drying, hot wind drying and the like or any combination thereof.

PREFERRED EMBODIMENTS OF THE INVENTION

The invention will now be further explained with reference to Examples and Test Examples.

EXAMPLE 1

Sea water taken off the coast of Yugawara, Kanagawa Prefecture, Japan was filtered with use of a No. 2 filter paper manufactured by Toyo Roshi Kabusiki Kaisha (Toyo Filter Paper Co., Ltd.), Japan. 200 g of the filtrate were added in 250 g of service or city water to prepare a salty aqueous medium. To the medium, 100 g of raw material potassium chloride were added and heated until boiling to dissolve the potassium chloride, and the resulting solution was cooled to 60° C. and concentrated under a reduced pressure with use of a rotary evaporator, so that the water content thereof was 18 weight %. The concentrate was taken in a ceramic dish and dried with use of a hot wind dryer (80° C.), so that the dried substance had a moisture content of 0.3 weight %. The dried substance was sieved with use of a screen of 20 mesh (JIS, Japanese Industrial Standard) to obtain a desired potassium chloride product. The content of sodium chloride therein was 5 weight %.

On the other hand, a control was prepared as stated below and in accordance with the method as disclosed in Japanese Unexamined Patent Publication No. 198953/1984. Namely, the control was prepared by initially preparing a mixture of sodium chloride and potassium chloride (1:9, weight ratio), weighing to take a natural bittern powder (water content of 14 weight %) manufactured by Sizenen Fukyu Kyoukai (Association for Spreading Natural Salt), Japan in an amount of 1 weight % as solid based on total amount of said mixture, dissolving the mixture and bittern in city water, concentrating the solution with use of a rotary evaporator to obtain crystals, heating the crystals in a hot wind dryer (80° C.) to obtain a dried product having a moisture content of a 0.3 weight % and then sieving the same with use of 20 mesh screen.

Both samples were subjected to a sensory test with licking using a professional test panel (20 members). A judgement was made with the sample having a taste closest to table salt being given first place and with use of Kramer's Examination method (level of significance; 5%). The sensory test method is described in the book "Sensory Evaluation of Food" published by Ellis Horwood Ltd.

Results are shown in the following Table 1. As seen from the Table, the potassium chloride product according to the process of the invention has the taste closest to the table salt, in comparison with the control, in spite of the fact that the content of sodium chloride in the former is lesser than in the latter.

TABLE 1

| samples | 1st place (rank position) persons | 2nd place (rank position) persons | ranking sum | note |
|---|---|---|---|---|
| invention product | 16 | 4 | 24 | there is notifiable difference |
| control | 4 | 16 | 36 | |

EXAMPLE 2

A potassium chloride containing solution was prepared in a same manner as Example 1. The solution was concentrated on a water bath, so that the water content thereof became 13 weight %. The concentrate was dried in the same manner as in Example 1, so that moisture content of the dried substance became 0.3 weight %. The substance was sieved to have a size of 20 to 30 mesh. This sample was made as a product of this invention.

On the other hand, a control sample was prepared as stated below and in accordance with the method disclosed in Japanese Unexamined Patent Publication No. 198953/1984. Namely the control was prepared by initially preparing a mixture of sodium chloride and potassium chloride (1:9, weight ratio), weighing to take a natural bittern powder (moisture content of 14 weight %) manufactured by Sizenen Fukyu Kyoukai, Japan in an amount of 20 weight % as solid based on total amount of said mixture, dissolving the mixture and bittern in city water. The solution was charged in a flat pot and concentrated by direct heating to generate crystals. The crystals were dewatered by a centrifugal treatment and dried with use of a hot wind dryer (75° C.), so that the moisture content of the dried substance became 0.3 weight %. The substance was sieved to have a size of 20 to 30 mesh.

Both samples were subjected to a panel test as in Example 1. Results are shown in following Table 2. As seen from the Table, the taste of the product of their invention is closer to the table salt than the control, in spite of the fact that the content of sodium chloride in the former is lesser than in the latter.

TABLE 2

| samples | 1st place (rank position) persons | 2nd place (rank position) persons | ranking sum | note |
|---|---|---|---|---|
| invention product | 17 | 3 | 23 | there is notifiable difference |
| control | 3 | 17 | 37 | |

TEST EXAMPLE 1

Various potassium chloride containing solutions were prepared by firstly adding, based on 1 weight part of potassium chloride, 4.16, 1.11, 0.67. 0.45 or 0.35 weight parts of the sea water, respectively, in distilled water and then dissolving therein the potassium chloride. Each of such solutions was heated on a water bath to evaporate water contained therein, so that the water content thereof became 13 weight %. Each concentrate was heated in a hot wind dryer (75° C.) to obtain a dried substance containing 0.3 weight % of moisture. The substance was sieved to have a size of 20 to 30 mesh. Each of the products was made as a test sample.

On the other hand, each of the control samples was prepared by dissolving potassium chloride into distilled water and treating the resulting solution in a manner similar to the above to obtain a dried and sieved product as the control sample.

A panel test similar to that in Example 1 was carried out between each of the test samples and each of the control samples. Results are shown in following Table 3. As seen from the Table, the desired effects bitterness of potassium chloride disappearing and its taste becoming close to that of table salt, can be obtained, when a salty water is added in 0.45 weight parts or more of the sea water, to 1 weight part of the potassium chloride.

TABLE 3

| sample | 1st place (rank position) person | 2nd place (rank position) | ranking sum | note |
|---|---|---|---|---|
| control | 0 | 20 | 40 | there is notifiable difference |
| 4.16 | 20 | 0 | 20 | |
| control | 2 | 18 | 38 | there is notifiable difference |
| 1.11 | 18 | 2 | 22 | |
| control | 4 | 16 | 36 | there is notifiable difference |
| 0.67 | 16 | 4 | 24 | |
| control | 5 | 15 | 35 | there is notifiable difference |
| 0.45 | 15 | 5 | 25 | |
| control | 7 | 13 | 33 | there is no notifiable |
| 0.35 | 13 | 7 | 27 | |

TABLE 3-continued

| sample | 1st place (rank position) persons | 2nd place (rank position) | ranking sum | note |
|---|---|---|---|---|
| | | | | difference |

In the Table, each of the samples indicated by 4.16, 1.11, 0.67, 0.45 and 0.35 is a test one obtained with use of sea water in amount as indicated (weight parts) to 1 weight part of potassium chloride.

EXAMPLE 3

To 100 ml of city water having an electrical conductivity of 180 μS/cm, 30 g of potassium chloride for food industry use were added and heated to boiling for dissolving the potassium chloride. The resulting solution was cooled to 60° C. and concentrated under a reduced pressure with use of a rotary evaporator to bring the water content thereof to 18 weight %. The concentrate was taken in a ceramic dish and dried with use of a hot wind dryer (80° C.) to obtain a dried substance having a moisture content of 0.3 weight %. The substance was sieved with use of a 20 mesh screen to obtain a first test sample treated with city water.

To 100 ml of deionized water having an electrical conductivity of 0.11 μS/cm, 30 g of potassium chloride for food industry use were added and heated to boiling for dissolving the potassium chloride. The resulting solution was treated in the manner similar to above to obtain a second test sample treated with deionized water.

Each of both test samples was subjected to a panel test as in Example 1 with use of the test samples and a non-treated potassium chloride, as a control, but for the bitterness and salty taste thereof. Results are shown in following Table 4 to 7. As seen from the Tables, the first test sample shows a higher taste improving effect than the second test sample and in other words, the electrical conductivity in the treating aqueous medium exerts an influence on the taste improvement.

(A) Control and First Test Sample

TABLE 4

| | (Reduction of bitterness) | | |
|---|---|---|---|
| | 1st place (rank position) persons | 2nd place (rank position) | ranking sum |
| control | 4 | 16 | 36 |
| 1st sample | 16 | 4 | 24 |

Judgment: There is notifiable difference.

TABLE 5

| | (Enhance of salty taste) | | |
|---|---|---|---|
| | 1st place (rank position) persons | 2nd place (rank position) | ranking sum |
| control | 4 | 16 | 36 |
| 1st sample | 16 | 4 | 24 |

Judgment: There is notifiable difference.

(B) Control and Second Test Sample

TABLE 6

| | (Reduction of bitterness) | | |
|---|---|---|---|
| | 1st place (rank position) persons | 2nd place (rank position) | ranking sum |
| control | 8 | 12 | 32 |
| 2nd sample | 12 | 8 | 28 |

Judgment: There is no notifiable difference.

TABLE 7

| | (Enhance of salty taste) | | |
|---|---|---|---|
| | 1st place (rank position) persons | 2nd place (rank position) | ranking sum |
| control | 7 | 13 | 33 |
| 1st sample | 13 | 7 | 27 |

Judgment: There is no notifiable difference.

EXAMPLE 4

A processed potassium chloride having moisture content of 0.3 weight % was obtained through dissolving, drying and screening as in Example 1, except that the aqueous medium used as potassium chloride dissolving water was a mineral water having an electrical conductivity of 310 μS/cm and containing 110 ppm in total of minerals such as Ca, Mg, K, Na and the like.

A panel test was carried out as in Example 3 and with use of the processed potassium chloride as test sample and a non-treated potassium chloride as control sample. Results are shown in following Tables 8 and 9. As seen from the Tables, there are notifiable difference in both of reduction of bitterness and enhancement of salty taste.

TABLE 8

| | (Reduction of bitterness) | | |
|---|---|---|---|
| | 1st place (rank position) persons | 2nd place (rank position) | ranking sum |
| control | 1 | 19 | 39 |
| test sample | 19 | 1 | 21 |

Judgment: There is notifiable difference.

TABLE 9

| | (Enhancement of salty taste) | | |
|---|---|---|---|
| | 1st place (rank position) persons | 2nd place (rank position) | ranking sum |
| control | 0 | 20 | 40 |
| test sample | 20 | 0 | 20 |

Judgment: There is notifiable difference.

EXAMPLE 5

In 120 ml of deionized water having an electrical conductivity of 0.11 μS/cm, 15 g of sodium chloride were dissolved to bring the electrical conductivity of the solution to 140 mS/cm. In the solution, 15 g of potassium chloride were dissolved. The resulting solution containing the sodium chloride and potassium chloride in same amount was concentrated on a water bath, so as to have a water content of 13 weight %. The concentrate was treated with use of a hot wind dryer (75° C.) to evaporate water therein, so that the moisture content thereof became 0.3 weight %. The dried substance was sieved to have a size of 20 to 30 mesh. The substance is referred to as a test sample.

On the other hand, a control sample was prepared by taking the same amount of sodium chloride and a food grade potassium chloride, both of which contains moisture in 0.3 weight % and have a size of 20 to 30 mesh, and by mixing the materials. (This mixture as control corresponds to the product obtained through the method disclosed in Japanese Examined Patent Application Gazette No. 13698/1972).

A panel test (20 members) was carried out on the test and control samples as well as 1 weight % aqueous solutions thereof. Results are shown in following Table 10. As seen from the Table, the product according to the invention is apparently preferred over the control product (level of significance; 5%).

TABLE 10

| processing method | taste (persons) | |
|---|---|---|
| | solid product (more near to table salt) | 1 weight % solution (more better in taste) |
| control | 0 | 1 |
| invention | 20 | 19 |

EXAMPLE 6

To 800 g of deionized water having an electrical conductivity of 0.11 µS/cm, 0.88 g of citric anhydride, 1.4 g of glycine and 2.9 g of sodium chloride were added to adjust the electrical conductivity to 69 mS/cm and then 300 g of food grade potassium chloride were dissolved in the solution. The resulting solution was dried with use of a spray dryer having a disc type atomizer, under conditions of inlet temperature of 165° C. and outlet temperature of 67° C. to obtain a processed potassium chloride product which contains moisture in 0.8 weight % and shows a good taste.

EXAMPLE 7

To 100 ml of city water having an electrical conductivity of 178 µS/cm, 0.003 g of magnesium chloride and 0.06 g of sodium glutamate were dissolved to adjust the electric conductivity to 447 µS/cm and then 30 g of food grade potassium chloride were dissolved in the solution. The resulting solution was treated as in Example 3 to obtain a processed potassium chloride having a moisture content of 0.3 weight %.

A panel test was carried out with use of the processed potassium chloride as a test sample and a non-treated potassium chloride as a control sample. All members of the panel judged that the test sample was more preferable than the control sample.

EXAMPLE 8

A potassium chloride product obtained through the treatment disclosed in Example 3 was sieved to have a size of 20 to 50 mesh.

On the other hand, a potassium chloride containing solution was separately prepared in the same manner as in Example 6. This solution was sprayed on the processed potassium chloride particles under a hot air condition to gradually increase the particle size and to obtain larger particles having about 3 mm in diameter.

A similar large size particle was also obtained, when the spraying was changed to a dropping treatment.

TEST EXAMPLE 2

(Application to a food)

0.85 g of a processed potassium chloride obtained by Example 6 and 0.85 g of a commercial refined table salt (sodium chloride) was dissolved in 95 ml of water to prepare a salty solution. The solution was poured into a pouch wherein frozen corns (95 g) have previously been charged. The pouch was sealed in a conventional manner with a heat sealer and then thermally sterilized at 118° C. for 30 minutes to obtain a pasteurized sweet corn sample.

On the other hand, pasteurized corn as a control sample was prepared in a manner similar to the above, except that 0.836 g of non-treated food grade potassium chloride, 0.002 g of citric acid, 0.004 g of glycine, 0.008 g of sodium chloride and 0.85 g of commercial refined table salt (sodium chloride) were employed as salty tasting components.

Each of the pouches was opened and a panel test was carried out on the test sample and control sample. All members of the panel judged that the test sample had better taste than the control sample.

TEST EXAMPLE 3

(Application to a food)

A processed mixture of potassium chloride and sodium chloride as in Example 5 (Product according to the invention) was sprinkled on washed and sliced turnips, in an amount of 1.2 weight % to the latter. The turnips were charged in a glass bottle and a weight was put on top. The bottle was placed in a refrigerator at 8° C. for 48 hours to prepare a test sample.

On the other hand, a control sample was prepared in a manner similar to above but with use of a mere mixture of non-treated potassium chloride and commercial refined sodium chloride. (This mixture corresponds to a product obtained by the process in Japanese Examined Patent Publication No. 13698/1972).

A panel test was carried out with use of the test sample and control sample. All of members of the panel judged that the test sample had better taste than the control sample.

TEST EXAMPLE 4

(Relation of electrical conductivity of dissolving water to taste of processed potassium chloride)

To deionized water having an electrical conductivity of 0.9 µS/cm, citric acid was dissolved in various amount to prepare solutions having electrical conductivities of 430, 200, 140, 120 and 100 µS/cm (each 100 ml).

20 g of food grade potassium chloride were added to each of said solutions. Each of the resulting solutions was heated at 60° C. and concentrated under a reduced pressure with use of an evaporator, so as to bring the water content thereof to 18 weight %. The concentrate was taken in a ceramic dish and dried in a hot wind dryer (75° C.) to obtain a processed potassium chloride with moisture content of 0.3 weight %. The product was sieved with use of a 20 mesh screen.

Each of the processed potassium chloride samples was tested by the panel (20 members) with use of non-treated food grade potassium chloride (content of KCl: more than 99 weight %), as a control.

Results are shown in following Tables 11 and 12. As seen from the Tables, the taste improving effects (reduction of bitterness and enhancement of salty taste) appear, when the dissolving water has the electrical conductivity of about 140 μS/cm or more.

TABLE 11

(Reduction of bitterness)

| Conductivity (μS/cm) | 1st place (rank position) persons | 2nd place (rank position) persons | ranking sum | note |
|---|---|---|---|---|
| control | 8 | 12 | 32 | there is no notifiable difference |
| 100 | 12 | 8 | 28 | |
| control | 7 | 13 | 33 | there is no notifiable difference |
| 120 | 13 | 7 | 27 | |
| control | 5 | 15 | 35 | there is notifiable difference |
| 140 | 15 | 5 | 25 | |
| control | 4 | 16 | 36 | there is notifiable difference |
| 200 | 16 | 4 | 24 | |
| control | 4 | 16 | 36 | there is notifiable difference |
| 430 | 16 | 4 | 24 | |

TABLE 12

(Enhancement of salty taste)

| Conductivity (μS/cm) | 1st place (rank position) persons | 2nd place (rank position) persons | ranking sum | note |
|---|---|---|---|---|
| control | 7 | 13 | 33 | there is no notifiable difference |
| 100 | 13 | 7 | 27 | |
| control | 7 | 13 | 33 | there is no notifiable difference |
| 120 | 13 | 7 | 27 | |
| control | 4 | 16 | 36 | there is notifiable difference |
| 140 | 16 | 4 | 24 | |
| control | 2 | 18 | 38 | there is notifiable difference |
| 200 | 18 | 2 | 22 | |
| control | 1 | 19 | 39 | there is notifiable difference |
| 430 | 19 | 1 | 21 | |

In both Tables, each of the samples indicated by numerals 100, 120, 140, 200 and 430 means that obtained with use of a salty medium having the electrical conductivity (μS/cm) as indicated, and the judgment as given in the column "note" was given with a level of significance of 5%.

TEST EXAMPLE 5

(Influence of mineral amount in dissolving medium, on taste)

To a mineral water having 143 ppm in total amount of minerals such as Ca, Mg, K, Na and the like (measured by atomic absorption photometry) and having an electrical conductivity of 400 μS/cm, distilled water was added in various amount to prepare solutions, each of which is adjusted to total mineral amount of 100, 65 and 40 ppm. And also a solution adjusted in the total mineral amount to 160 ppm was prepared by admixing same additional suitable minerals and the mineral water. The electrical conductivity of each solution was readjusted to 400 μS/cm by adding and dissolving therein citric acid. 100 ml of each of the resulting solutions were taken and used as a medium for dissolving potassium chloride.

In each of the dissolving media, 20 g of food grade potassium chloride were dissolved, dried and sieved as in Test Example 4 to obtain processed potassium chloride samples, each having a moisture content of 0.3 weight %.

Each of the processed potassium chloride samples was subjected to a panel test (20 members) in comparison with a non-treated food grade potassium chloride used as a control which has an electrical conductivity of 400 μS/cm obtained by admixing with citric acid and the distilled water, as in Test Example 4.

Results are shown in following Tables 13 and 14. As seen from the Tables, the salty taste will be enhanced, as the mineral amount in the dissolving medium increases.

TABLE 13

(Reduction of bitterness)

| Metal Ion Content (ppm) | 1st place (rank position) persons | 2nd place (rank position) persons | ranking sum | note |
|---|---|---|---|---|
| control | 4 | 16 | 36 | there is notifiable difference |
| 40 | 16 | 4 | 24 | |
| control | 3 | 17 | 37 | there is notifiable difference |
| 65 | 17 | 3 | 23 | |
| control | 2 | 18 | 38 | there is notifiable difference |
| 100 | 18 | 2 | 22 | |
| control | 1 | 19 | 39 | there is notifiable difference |
| 160 | 19 | 1 | 21 | |

TABLE 14

(Enhance of salty taste)

| Metal Ion Content (ppm) | 1st place (rank position) persons | 2nd place (rank position) persons | ranking sum | note |
|---|---|---|---|---|
| control | 8 | 12 | 32 | there is no notifiable difference |
| 40 | 12 | 8 | 28 | |
| control | 2 | 18 | 38 | there is notifiable difference |
| 65 | 18 | 2 | 22 | |
| control | 2 | 18 | 38 | there is notifiable difference |
| 100 | 18 | 2 | 22 | |
| control | 0 | 20 | 40 | there is notifiable difference |
| 160 | 20 | 0 | 20 | |

In the Tables, each of the samples indicated by numerals 40, 65, 100 and 160 is a test one obtained with use of dissolving medium in the amount as indicated, and the judgment given in the column "note" was given with a level of significance 5%.

We claim:

1. A process for treating potassium chloride, which comprises the steps of dissolving potassium chloride in an aqueous medium having a conductivity of at least 140 μS/cm and a metal ion content of at least 65 ppm, and then evaporating the water from the resulting solution, wherein the amount of potassium chloride is at most 30% by weight of the aqueous medium, said aqueous medium comprising at least one medium selected from the group consisting of drinking water, distilled water, deionized water, and salt water.

2. A process according to claim 1, wherein the electrical conductivity and/or metal ion content of said aqueous medium are adjusted by adding to the aqueous medium at least one compound selected from the group consisting of carboxylic acids and their salts.

3. A process according to claim 2, wherein said carboxylic acid is citric acid.

4. A process according to claim 1, wherein the electrical conductivity and/or metal ion content of said aqueous medium are adjusted by adding to the aqueous medium at least one compound selected from group consisting of amino acids and their salts.

5. A process according to claim 4, wherein said amino acid is selected from the group consisting of glycine, alanine and glutamic acid.

6. A process according to claim 4, wherein said salt of an amino acid is sodium glutamate.

7. A process according to claim 1, wherein the electrical conductivity and/or metal ion content of said aqueous medium are adjusted by adding to the aqueous medium at least one compound selected from group consisting of compounds which dissociate in the aqueous medium to given metal ions.

8. A process according to claim 7, wherein said metal ions are selected from the group consisting of $Na^+$, $K^+$, $Ca^{++}$ and $Mg^{++}$.

9. A potassium chloride product prepared by dissolving potassium chloride in an aqueous medium having a conductivity of at least 140 $\mu$S/cm and a metal ion content of at least 65 ppm, and then evaporating the water from the resulting solution, wherein the amount of potassium chloride is at most 30% by weight of the aqueous medium, said aqueous medium comprising at least one medium selected from the group consisting of drinking water, distilled water, deionized water, and salt water.

* * * * *